US008577796B2

(12) United States Patent
Ross et al.

(10) Patent No.: US 8,577,796 B2
(45) Date of Patent: Nov. 5, 2013

(54) FINANCIAL CHARGE REBATE

(75) Inventors: Erik Stephen Ross, Charlotte, NC (US); Matthew Rice, Wilmington, DE (US); Hans Dirk Schumacher, Matthews, NC (US); David Neil Joffe, Charlotte, NC (US); Yanghong Shao, Charlotte, NC (US); Tracy Elizabeth Marcin, Newark, DE (US); John Scott Bailer, Wilmington (DE)

(73) Assignee: Bank of America Corporation, Charlotte, NC (US)

( * ) Notice: Subject to any disclaimer, the term of this patent is extended or adjusted under 35 U.S.C. 154(b) by 688 days.

(21) Appl. No.: 12/652,568

(22) Filed: Jan. 5, 2010

(65) Prior Publication Data

US 2011/0166920 A1   Jul. 7, 2011

(51) Int. Cl.
*G06Q 40/00* (2012.01)

(52) U.S. Cl.
USPC .................................. 705/39; 705/38; 705/35

(58) Field of Classification Search
USPC ........................................ 705/35, 38, 39, 40
See application file for complete search history.

(56) References Cited

U.S. PATENT DOCUMENTS

| 2003/0064788 | A1* | 4/2003 | Walker et al. ................... 463/20 |
| 2004/0073504 | A1 | 4/2004 | Bryman et al. |
| 2008/0255897 | A1 | 10/2008 | Megdal et al. |

* cited by examiner

*Primary Examiner* — Ojo O Oyebisi
(74) *Attorney, Agent, or Firm* — Banner & Witcoff, Ltd.; Michael A. Springs

(57) ABSTRACT

Aspects of the disclosure relate to assisting credit account holders during economic hardship. More specifically, aspects of the disclosure relate to systems and methods for providing a rebate of at least a portion of a finance charge applied to a credit account. Unlike certain prior art systems and methods, embodiments disclosed herein may benefit both the credit account holder as well as the financial institution that extends the credit account. In one embodiment, it may be determined that several credit accounts meet a threshold of probability of having a charge-off. In certain embodiments, the number of accounts that receive a rebate may be limited to a certain percentage of credit accounts with a non-zero balance.

20 Claims, 2 Drawing Sheets

FINANCIAL CHARGE REBATE

TECHNICAL FIELD

Aspects of the disclosure relate to assisting credit account holders during adverse economic periods. More specifically, aspects of the disclosure relate to systems and methods for providing a rebate of at least a portion of a finance charge applied to a credit account.

BACKGROUND

During periods of economic decline or stagnation, consumers and businesses alike typically increase balances on credit accounts. For example, revolving credit accounts like credit cards generally permit an account holder to purchase goods and necessities using a credit line associated with a finance charge. The finance charge may be applied as an annual percentage rate (APR) on a monthly billing cycle. Unfortunately, however, during adverse economic periods, an account holder may miss one or more payments or be forced to select which accounts are paid while others remain unpaid. Unfortunately, such actions are harmful to the both the account holder and the financial institution that extended the account to the account holder. The account holder's credit rating may be adversely impacted and the financial institution may have to take a "charge off," where the credit balance on the account is written off as a loss.

Prior attempts to minimize the impact of harsh economic conditions on credit accounts often focused on reducing charge-offs, however, did not adequately address the economic realities facing the credit account holder. For example, one prior attempt focused on reducing the minimum payment amount for a billing period. For example, if a credit account had a $200 minimum payment amount to be paid for the next month (billing period), the minimum payment may have been adjusted to require that the account holder pay only $150. Although such attempts reduced the monthly expenditure by $50, they often did not assist the account holder in reducing the account balance. Specifically, the finance charges absorb a larger portion of the payment, thus the credit balance declines at a slower pace (or may even stay the same). Despite being a popular approach, it often causes the financial institution to have a charge-off and an adverse effect on the credit account holder's credit rating.

New systems and methods that reduce charge-offs could permit the financial institution to extend credit or otherwise assist other credit account holders during periods of economic turmoil. Further, the account holder may retain a desired credit rating (or at least minimize any adverse impact to his/her credit rating). For this and other reasons, systems and methods that alleviate some or all of the negative aspects of prior art systems would be beneficial to the art.

BRIEF SUMMARY

The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

Aspects of the disclosure relate to reducing the economic burden on credit account holders. Further aspects relate to preventing or minimizing excessive expenses on the financial institution holding a past due or suspected to be past due credit account. Further aspects of the disclosure relate to reducing past due amounts in credit accounts.

Aspects of the invention may be provided in a computer-readable medium having computer-executable instructions to perform one or more of the process steps described herein. In one illustrative process, a notification may be received indicating that a credit account meets a threshold probability of resulting in a charge-off to the financial institution extending the credit account. In one embodiment, the notification may comprise an indication that several accounts are likely to result in a charge-off. The notification may be generated as a result of one or more algorithms that determine which accounts from several accounts are likely to result in a charge-off. The credit accounts that meet the threshold probability may be past due, current, or combinations thereof.

In one embodiment, the determination may be performed, at least in part, with an account monitor module on a computing device. In certain embodiments, the determination may consider information such as the account holder's utilization of the credit account, account transactions (including past due accounts and payment history), inquiries into the credit account, information from other accounts, and combinations thereof. In certain embodiments, the notification may be a result of a proactive event by the account holder, such as for example, contacting the financial institution and indicating that they are experiencing adverse economic conditions. In one embodiment, the proactive event may include an indication by the account holder that they may not make a minimum payment amount. In certain embodiments, the account holder may be under financial distress but not qualify or one or more "workout" programs offered by the financial institution, a third party, including a government agency.

In one embodiment, it may be determined (or a notification indicative of the determination may be received) that the minimum payment amount was received for a first billing period for at least one of the credit accounts determined to meet and/or exceed the threshold. The reception or determination may be made by a payment monitor module. Based upon the reception of the minimum payment amount received for that billing period, the credit account may be deemed eligible for a rebate up to and including the finance charge during the first billing period. In one embodiment, the minimum payment amount due is not reduced for the next billing period.

A notification indicating eligibility for the rebate may be provided to an account holder of the credit account, thereby incentivizing the account holder to promptly pay the required payment. Such notification may notify the account holder of further restrictions or eligibility requirements for the rebate. In one embodiment, in order to remain eligible for the rebate the credit balance cannot increase between the first billing period and a second billing period. In another embodiment, no activity that increases the credit balance may occur between two billing periods to remain eligible for the rebate. In further embodiments, the minimum payment amount must be received before a specified date to remain eligible. Those skilled in the art will understand that other restrictions may be applied without departing from the scope of this disclosure.

Further embodiments may adjust the quantity of credit accounts that are eligible for the rebate. As can be appreciated by those skilled in the art, a financial institution may desire to assist as many account holders as feasible; however, extending the rebate to too many credit accounts may reduce the financial institution's ability to assist other types of account holders. In one embodiment, the threshold and/or one or more criteria used to determine if a credit account meets the threshold is adjusted. In one embodiment, the threshold is set such that approximately 1.5% of the credit accounts that have a non-zero credit balance meet or exceed the threshold.

Further aspects relate to systems for performing one or more of the processes described herein. In one embodiment, the system may comprise an account monitor module configured to receive electronic signals indicative that one or more credit accounts meet a threshold of probability of having a charge-off. The system may comprise a payment monitor module that is in communication with the account monitor module. The payment monitor module may be configured to receive electronic signals indicative that the minimum payment amount was received for a first billing period of the billing cycle for at least a subset of the credit accounts. In further embodiments, a selection module may determine, based upon information received at the account monitor and the payment monitor, that at least a portion of the credit accounts within the subset are eligible for a rebate up to and including the finance charge.

Various embodiments of the invention may be implemented in personal credit accounts including individual and joint accounts. However, it is also contemplated that various embodiments of the invention can also be implemented in commercial accounts for businesses. These and other aspects of the invention are discussed in greater detail throughout this disclosure, including the accompanying drawings.

BRIEF DESCRIPTION OF THE DRAWINGS

The present disclosure is illustrated by way of example and not limited in the accompanying FIGS. in which like reference numerals indicate similar elements and in which.

DETAILED DESCRIPTION

Aspects of the disclosure relate to systems and methods for providing a rebate of at least a portion of a finance charge applied to a credit account. In one embodiment, the credit account may be a revolving credit account, such as a credit card. For example, a finance charge may be applied as an annual percentage rate (APR) of the outstanding credit balance on a monthly billing cycle (thus, each month is a billing period). Certain systems and methods disclosed herein could be implemented to apply a rebate of a previous month's finance charge (or a portion thereof). As explained immediately below, certain embodiments may be implemented by one or more computing devices adapted to conduct one or more processes described herein.

Figure 1:
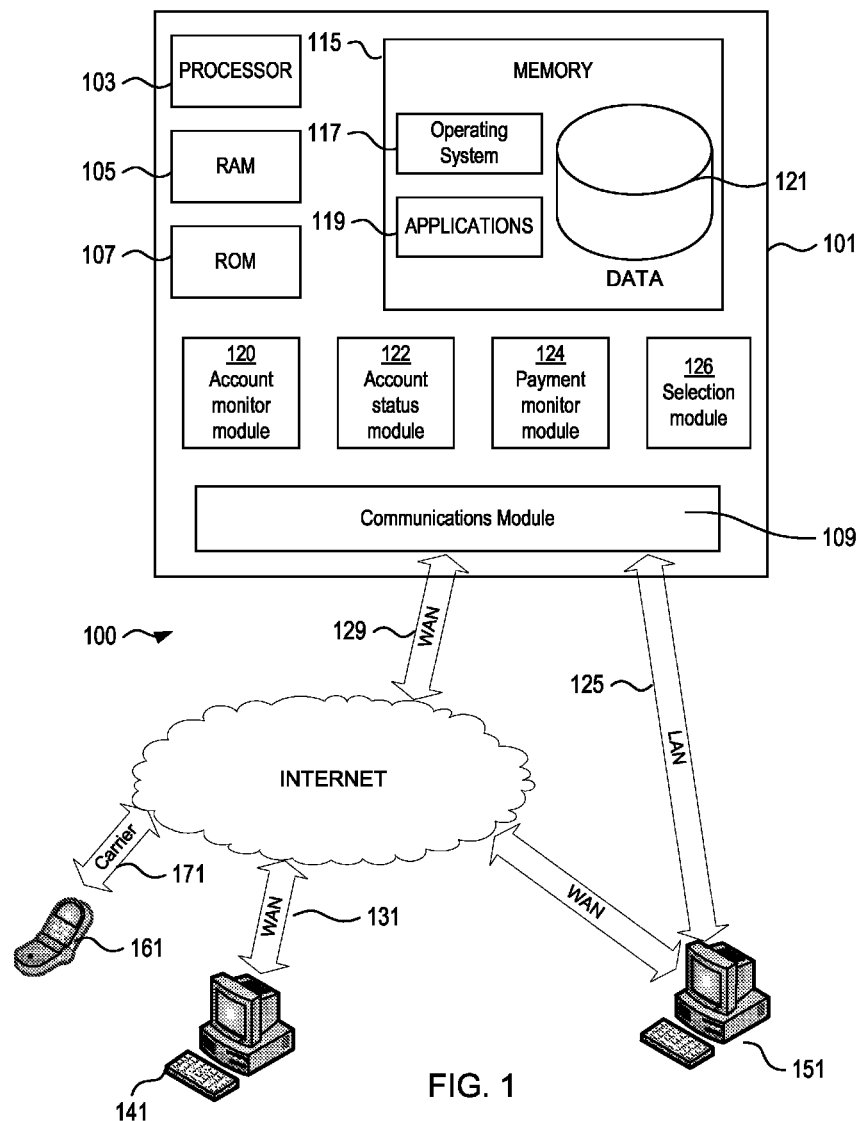
FIG. 1 shows an illustrative operating environment in which various aspects of the invention may be implemented.
Figure 2:
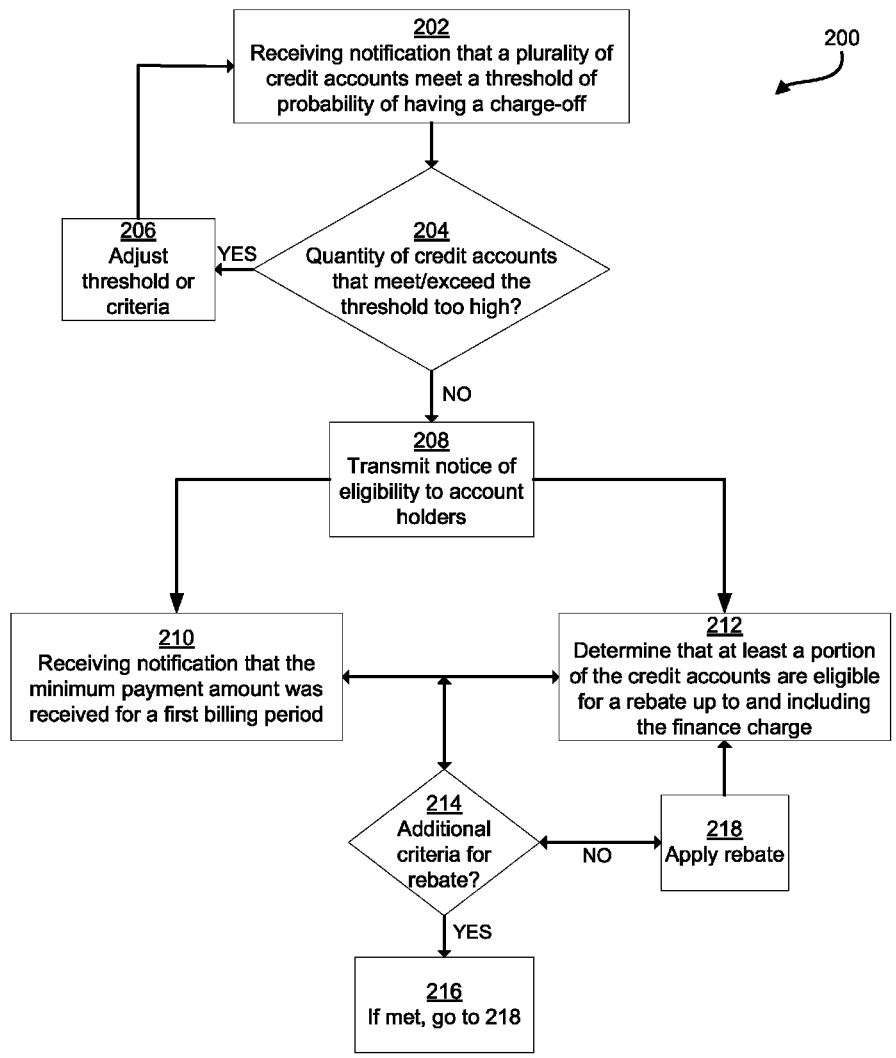
FIG. 2 is a flowchart showing an illustrative method in accordance with an embodiment of the invention.

FIG. 1 illustrates an example of a suitable computing system environment 100 for implementing the processes described herein, for example, executing one or more processes shown in FIG. 2. The computing system environment 100 is only one example of a suitable computing environment and is not intended to suggest any limitation as to the scope of use or functionality of the invention. The computing system environment 100 should not be interpreted as having any dependency or requirement relating to any one or combination of components shown in the illustrative computing system environment 100.

Various embodiments of the invention are operational with numerous other general purpose or special purpose computing system environments or configurations. Examples of well known computing systems, environments, and/or configurations that may be suitable for use with various embodiments of the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. A modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although not shown, RAM 105 may include one or more applications representing the application data stored in RAM 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown). Database 121 may provide centralized storage.

Computing device 101 may operate in a networked environment supporting connections to one or more remote computing devices, such as account holder computing devices 141 and 151. The account holder computing devices 141 and 151 may be personal computing devices or servers that include many or all of the elements described above relative to the computing device 101. Account holder computing device 161 may be a mobile device communicating over wireless carrier channel 171 or through a wireless LAN or WAN.

The network connections depicted in FIG. 1 include a local area network (LAN) 125 and a wide area network (WAN) 129, but may also include other networks. When used in a LAN networking environment, computing device 101 is connected to the LAN 125 through a network interface or adapter in the communications module 109. When used in a WAN networking environment, computing device 101 may include a modem in the communications module 109 or other means for establishing communications over the WAN 129, such as the Internet. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, one or more application programs 119 used by the computing device 101, according to an illustrative embodiment, may include computer executable instructions, that when executed by a processor, such as processor 103 may execute methods that use one or more modules, such as account monitor module 120, account status module 122, payment monitor module 124, and/or selection module 126. Modules 120, 122, 124, and 126 may comprise hardware, software, or combinations thereof. Further, while the illustrative embodiment shows the modules 120, 122, 124, and 126 within computing device 101, those skilled in the art will understand that one or more modules may be located in one or more different computing devices, such as for example, in communication through WAN 129 and/or 131, LAN 125, and/or carrier 171. Moreover, one or more of the modules 120, 122, 124, 126 may be combined and are not required to be physically or logically separated. Illustrative implementations of modules 120, 122, 124 and 126 will be described in more detail later in this disclosure.

Illustrative embodiments discussed herein may include forms of computer-readable media. Computer-readable media include any available media that can be accessed by a computing device 101. Computer-readable media may include storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Aspects of the disclosure relate to reducing past due amounts in credit accounts. As used herein, a credit account is an account that includes a credit balance, a finance charge, and a billing cycle having a minimum payment amount for a billing period of the billing cycle.

FIG. 2 is a flowchart 200 of an illustrative method in accordance with one embodiment of the invention. The method of FIG. 2 may be implemented by one or more of the components in FIG. 1 and/or other components, including other computing devices. As depicted in FIG. 2, step 202 may include receiving a notification (i.e., through electronic signals) that a credit account meets a threshold probability of leading to a charge-off for the financial institution that holds the account. In one embodiment, the notification may be received by the account monitor module 120 shown in FIG. 1. In one embodiment, the account monitor module 120 may be utilized, at least in part, in any determination(s) whether the credit account meets the threshold. Thus, in certain embodiments, the reception of any electronic signals indicative that an account meets the threshold may be from a determination conducted, at least in part, within the account monitor module 120. While the illustrative embodiments discussed below are described in relation to the illustrative account monitor module 120, those skilled in the art will appreciate that other computing devices, or components thereof, may be used or modified to fulfill the function of the disclosed account monitor module 120 without departing from the scope of the invention.

In certain embodiments, the account monitor module 120 may receive information or be configured to calculate the utilization of the credit account by an account holder. In one embodiment, the utilization of the credit account is calculated by determining the current balance of the card and the credit limit. Yet in another embodiment, a time-weighted average may be used to consider the utilization of the credit account. The account monitor module 120 may also receive or derive information regarding inquiries into the credit account. For example, if the account holder has applied for more credit and/or conducted certain financial activities, third-parties may have inquired into the credit history or status of the account holder's credit report at credit bureaus. Thus, information regarding recent activity (or the frequency of such activity) may be utilized, in whole or in part, in determining whether the account meets the threshold (and thus, whether the notification of step 202 is transmitted).

In another embodiment, transactions involving the credit account may be considered when determining whether the account meets the threshold. For example, payment history including any past due amounts may be relevant. Further, recent activity may suggest that the account holder is likely to have a past due amount or unpaid. In another embodiment, information from one or more other accounts, which may or may not be credit accounts, may be received. Status information regarding one or more accounts may be received through communications module 109 and/or generated or stored at account status module 122. Types of accounts include, but are not limited to, savings accounts, money market accounts, line of credit accounts, checking accounts, credit card accounts, brokerage money market accounts, other investment accounts (e.g., accounts containing both book-entry and physical securities), or a combination of one or more of various account types.

The types of transactions can be, but are not limited to, ATM transactions, check drafting transactions, cash withdrawals, credit/debit card transactions, ACH transactions, wire transactions, online billpay, person-to-person payment network transactions, and other transactions. Additional information may include the balance, date opened, date closed, credit line, charges for late payment, account deficiencies, utilization, and/or any information that may determine the financial health of the account holder. For certain accounts, the credit account holder may not be the sole account holder and/or have primary responsibility, and the information from those accounts may be weighted accordingly in any determination(s).

Whether a credit account meets a threshold may be determined by a plurality of different methods. Some methodologies are well known in the art and do not warrant further discussion. In certain embodiments, the quantity of credit accounts that meet the threshold may be limited. Step 204 may include quantification of credit accounts that meet the threshold. For example, in tough economic climates, the quantity of credit accounts that meet (or exceed) the threshold may be elevated. While it is the goal of certain embodiments to reduce the economic burden on account holders, incurring excessive expenses on the financial institution holding the credit account may result in high losses, which could prevent the financial institution to extend credit or otherwise assist other account holders during periods of economic turmoil. Thus, if at step 204 it is determined that too many credit accounts meet the threshold, step 206 may be implemented to alter the threshold and/or one or more criteria used to determine if a credit account meets the threshold.

In one embodiment, the threshold may be set so that about 1.5% of credit accounts with a non-zero balance meet and/or exceed the threshold. The percentage of credit accounts that meet and/or exceed the threshold may be different for other embodiments. In an effort to assist more of its credit account holders through tough economic times, the financial institution may adjust the threshold and/or the criteria at 206 to include more accounts. In certain embodiments, step 202 may again be performed following 206.

Step 208 may be implemented to transmit notification to the account holder of the credit account that the account has been considered eligible for a rebate. In certain embodiments, the account holder may be notified that the credit account may be eligible to receive a full or partial rebate of a finance charge applied during a billing period of a billing cycle if the minimum payment amount is timely received. In one embodiment, step 208 is "proactive" such that it may be implemented as a result of an event, such as step 202, in which it is determined that the credit account meets or exceeds the threshold and/or the credit account becomes past due and/or remains unpaid. In this regard, proactive events do not require an account holder to contact the financial institution to request assistance or to obtain the rebate. In certain embodiments, proactive events may allow the financial institution to identify a current credit account that is likely to become past due. Thus, implementing one or more proactive events may allow the financial institution to proactively assist the credit account holder.

In other embodiments, step 208 may be reactive. For example, a credit account holder may contact the financial institution who issued the credit account to indicate that they are undergoing financial difficulty. In one embodiment, the credit institution may determine (either manually or electronically) that the credit account holder does not qualify for a "workout" program before determining to undertake reactive events. The "workout" programs considered by the financial institution may be those managed, implemented, or controlled either by the financial institution and/or third parties, including government agencies. In response, step 208 may be implemented and the corresponding credit account may be marked as meeting and/or exceeding the threshold. Thus, in certain embodiments, the criteria of step 202 may include interactions with the credit account holder. In alternative embodiments, step 208 may occur after such rebates (see, e.g. step 212) are applied to the credit account.

Delivery channels to transmit the notification may include, but are not limited to, the internet, email or other electronic messaging, phone and/or facsimile. For example, communications module 109 shown in FIG. 1 may be used. In certain embodiments, account holders may receive the notification via mobile phone, smartphone, PDA, personal computer, fax machine, etc, such as accessible over carrier channel 171 and/or through a wireless LAN 125 or WAN 129/131.

At step 210, a notification may be received that includes information indicative that the minimum payment amount for a billing period was received in regards to the credit account. In certain embodiments, the notification includes information that the minimum payment amount was received for at least a subset of the plurality of credit accounts that meet and/or exceed the threshold. In one embodiment, payment monitor module 124 of FIG. 1 may be used to receive such notification (such as through communications module 109) and/or generate the notification, such as with processor 103. Such processes for determining whether a payment was received are known in the art and will not be described in detail here.

In one embodiment, payment monitor module 124 may be configured to determine the amount of the payment received, the date received, and/or the date posted. In further embodiments, the payment monitor module 124 may calculate whether the payment was received during the applicable billing period, such as for example, using the above-identified information. In one embodiment, the payment monitor module 124 may be configured to transmit an electronic signal to another module, such as selection module 126 indicative that the payment was received. In another embodiment, payment monitor module 124 may electronically "flag" data, such as a file stored on a computer-readable medium, such as within data 121 indicative that payment was received for the particular credit account(s).

At step 212, it may be determined that at least a portion of the credit accounts within the subset are eligible for a rebate due to the minimum payment amount being received. In certain embodiments, the rebate amount is up to and includes the finance charge and may be applied before the next billing period. The determination of step 212 may be made, at least in part, using processor 103. In certain embodiments, selection module 126 may be used to determine which account(s) are eligible. The selection module 126 may be configured to read electronically stored information, such as data 121 to locate any "flags" indicative of selected files, such as flags written by the payment monitor module 124. As shown in FIG. 2 step 210 and 212 may occur at least partially simultaneously or serially in which step 212 may be initiated before and/or after step 210.

In certain embodiments, additional criteria must be met before the rebate is applied to a credit account. Thus, step 214 may be implemented to determine (or receive notification) whether additional criteria have been satisfied. For example, in some embodiments, a rebate might not be applied to an account if the credit balance increases during one or more billing periods of the billing cycle. For example, if the credit account is a revolving credit card account with a monthly billing cycle and the credit balance increases during the billing period representing the third month, the credit account might not be eligible for the rebate for that third month. In certain embodiments, the credit account may no longer be eligible for any further rebates following the billing period in which the credit account balance increased. In yet other embodiments, the credit account might not be eligible for rebates for a predefined quantity of billing periods. Yet in another embodiment, the credit account might not be eligible for the rebate until the credit balance is at or below a predetermined amount.

In further embodiments, step 214 may determine (or receive notification of the determination) whether any activity that increases the credit balance within a billing period has occurred. Thus, although the credit balance may be lower than the prior billing period, the credit account may not remain eligible for the rebate if any activity (such as purchases) results in any increase in the current balance. Such restrictions may be useful when a financial institution must close an account but still wishes to incentivize the account holder to repay the credit balance.

Further criteria may relate to whether the minimum amount due was received within a predefined time period. In one embodiment, the payment must be received before the regular "due date" of the billing period to retain eligibility for the rebate. In another embodiment, receiving the payment late may remove the credit account from eligibility for at least that billing period. In one embodiment, if the quantity of late payments meets or exceeds a threshold during a predefined time period (such as one year) then the credit account may no longer be eligible for the rebate for future billing periods.

Those skilled in the art will readily understand that the determination whether criteria has been satisfied may be conducted over time and, thus certain determinations may be made before one or more steps, including steps 202-212. Furthermore, one or more processes may be provided to generate communication through any communication medium, electronic or physical, informing the account holder of the credit account of the criteria of step 214, such as for example, when informing the account holder the credit account is eligible for the rebate. As shown in FIG. 2, if the criteria are met at step 216, step 218 may be implemented in which the rebate is applied.

In one embodiment implementing step 218, the rebate may be applied to the next billing period (such as the next month), yet in other embodiments, the rebate may not be applied to the credit account for a predefined period of time (after 6 months). In certain embodiments, the rebate is not applied against the funds of the credit balance, but rather is applied, either partially or wholly, of the applicable finance charge, thus in certain embodiments, the minimum payment amount due is not reduced for the next billing cycle.

Steps 210 and/or 214 may be implemented at regular or irregular intervals to further determine if additional rebates are applicable, such as during subsequent billing periods. Aspects of the disclosed systems and methods may benefit the financial institution while being implemented efficiently and at a relatively low cost. In providing assistance to credit account holders during periods of economic hardship, the financial institution is providing an incentive for the customer to bring to the financial institution more of their financial holdings. The financial institution might also use existing payment channels, transaction transfer capabilities, and messaging preferences in combination and with customer defined profile choices to conduct transactions efficiently and at a relatively low cost. The credit account holder also benefits by spending less capital to pay off the credit balance and/or by maintaining (or minimizing adverse effects to) an existing credit rating.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-readable medium having computer-executable instructions that, when executed by a processor, perform:
   receiving notification that a plurality of credit accounts meet a threshold of probability of having a charge-off, wherein each of the credit accounts comprises a credit balance, a finance charge, and a billing cycle having a minimum payment amount;
   for at least a subset of the plurality of credit accounts, receiving notification that the minimum payment amount was received for a first billing period of the billing cycle; and
   determining that at least a portion of the credit accounts within the subset are eligible for a rebate up to the finance charge amount during the first billing period.

2. The computer-readable medium of claim 1, the instructions further comprising:
   applying the rebate to the finance charge amount of the first billing period, wherein the minimum payment amount due is not reduced for a second billing period.

3. The computer-readable medium of claim 1, the instructions further comprising:
   determining that the plurality of credit accounts meet the threshold of probability of having a charge-off, wherein the determination is based on information selected from the group consisting of: the utilization of the credit account, credit account transactions, inquiries into the credit account, information from other accounts, and combinations thereof.

4. The computer-readable medium of claim 1, the instructions further comprising:
   for at least one eligible credit account, receiving notification that the credit balance has not increased between the first billing period and the second billing period, wherein if the credit balance has not increased, the at least one credit account remains eligible for the rebate.

5. The computer-readable medium of claim 1, the instructions further comprising:
   determining that the minimum payment amount was received within a predefined time period for a credit account, and determining that the credit account remains eligible for the rebate.

6. The computer-readable medium of claim 4, the instructions further comprising:
   determining whether the credit balance has increased during a billing period, wherein if the credit balance has increased, determining that the credit account is not eligible for the rebate.

7. The computer-readable medium of claim 1, further comprising:
   transmitting notification to an account holder of a first credit account that the first credit account is eligible for the rebate.

8. The computer-readable medium of claim 1, further comprising:
   determining that a payment for a first credit account within the subset of credit accounts was received late;
   determining whether a quantity of payments were received late within a predefined time period for the first credit account, wherein if the quantity of payments received late are below the threshold, the credit account remains eligible for the rebate.

9. The computer-readable medium of claim 1, the instructions further comprising:
   quantifying the plurality of credit accounts that meet the threshold;
   based on the quantity of credit accounts that meet the threshold, adjusting the threshold, one or more criteria used to determine if a credit account meets the threshold or combinations thereof.

10. The computer-readable medium of claim 9, wherein the threshold is set such that approximately 1.5% of the credit accounts that have a non-zero credit balance meet or exceed the threshold.

11. A system comprising:
- a processor;
- an account monitor module configured to receive electronic signals indicative that a plurality of credit accounts meet a threshold of probability of having a charge-off, wherein each of the credit accounts comprises a credit balance, a finance charge, and a billing cycle having a minimum payment amount;
- a payment monitor module in communication with the account monitor module configured to receive electronic signals indicative that the minimum payment amount was received for a first billing period of the billing cycle for at least a subset of credit accounts; and
- a selection module in communication with the processor for determining based upon information received at the account monitor and the payment monitor that at least a portion of the credit accounts within the subset are eligible for a rebate up to and including the finance charge during the first billing period.

12. The system of claim 11, wherein the system comprises a computer-readable medium comprising computer-executable instruction that when executed by the processor, perform a method comprising:
applying the rebate to the finance charge amount of the first billing period.

13. The system of claim 12, wherein the system is configured such that the minimum payment amount for the credit accounts in the subset of credit accounts is not reduced for a second billing period.

14. The system of claim 11, wherein the account monitor module is configured to determine whether that the plurality of credit accounts meet the threshold of probability of having a charge-off, wherein the determination is based on information selected from the group consisting of: the utilization of the credit account, credit account transactions, inquiries into the credit account, information from other accounts, and combinations thereof.

15. The system of claim 12, wherein the payment monitor module is further configured to determine that the minimum payment amount was received within a predefined time period for a credit account, wherein the credit account remains eligible for the rebate.

16. The system of claim 11, further comprising a communications module configured to transmitting notification to an account holder of a first credit account that the first credit account is eligible for the rebate.

17. The system of claim 11, wherein the system comprises a computer-readable medium comprising computer-executable instruction that when executed by the processor, perform a method comprising:
- quantifying the plurality of credit accounts that meet the threshold;
- based on the quantity of credit accounts that meet the threshold, adjusting the threshold, one or more criteria used to determine if a credit account meets the threshold or combinations thereof.

18. The system of claim 17, wherein the threshold is set such that approximately 1.5% of the credit accounts that have a non-zero credit balance meet or exceed the threshold.

19. A computer-readable medium comprising computer-executable instruction that when executed by the processor, perform a method comprising:
- receiving information from a cardholder indicative that the minimum balance due of a credit account will not be received within a billing period, wherein the credit account comprises a credit balance, a finance charge, and a billing cycle having a minimum payment amount for each billing period of the billing cycle;
- receiving notification that the minimum payment amount was received for a first billing period of the billing cycle;
- based upon, at least in part, that the minimum payment was received, determining that the credit account is eligible for a rebate up to and including the finance charge during the first billing period; and
- applying the rebate, wherein the minimum payment amount due is not reduced for a second billing period.

20. The computer-readable medium of claim 1, wherein the determination that the credit account is eligible for the rebate further considers information selected from the group consisting of: the utilization of the credit account, credit account transactions, inquiries into the credit account, information from other accounts, and combinations thereof.

* * * * *